United States Patent [19]
Ieda

[11] Patent Number: 6,073,731
[45] Date of Patent: Jun. 13, 2000

[54] MULTI-PLATE TYPE BRAKE FOR VEHICLE

[75] Inventor: Yoshihisa Ieda, Saitama, Japan

[73] Assignee: Honda Giken Kogyo Kabushiki Kaisha, Tokyo, Japan

[21] Appl. No.: 09/150,743

[22] Filed: Sep. 10, 1998

[30] Foreign Application Priority Data

Sep. 11, 1997 [JP] Japan .................................. 9-246858

[51] Int. Cl.⁷ .................................................. F16D 55/36
[52] U.S. Cl. ........................................ 188/71.5; 192/12 B
[58] Field of Search ........................... 188/71.5; 192/12 B

[56] References Cited

U.S. PATENT DOCUMENTS

| | | | |
|---|---|---|---|
| 4,128,145 | 12/1978 | Euler | 188/71.5 |
| 5,267,917 | 12/1993 | Kadatoni et al. | 192/12 B |
| 5,441,131 | 8/1995 | Mayer et al. | 188/71.5 |
| 5,701,976 | 12/1997 | Kumagai | 188/71.5 |

FOREIGN PATENT DOCUMENTS

55-047443 U 3/1960 Japan .

*Primary Examiner*—Robert J. Oberleitner
*Assistant Examiner*—Devon Kramer
*Attorney, Agent, or Firm*—Birch, Stewart, Kolasch & Birch, LLP

[57] ABSTRACT

A multi-plate type brake for a vehicle is provided in which a high braking force is realized during a forward motion of the vehicle and the braking force can be automatically reduced during a backward motion of the vehicle. A first rotary brake plate is connected to the rotary shaft. A second rotary brake plate is arranged around the rotary shaft in such a way that they may be rotated in a relative manner. A one-way clutch is installed between the rotary brake plate and the rotary shaft. A first fixed brake plate is overlapped on the first rotary brake plate, a second fixed brake plate is overlapped on the second rotary brake plate. A brake case is provided for unrotatably supporting the first and second fixed brake plates. A pressing member forcedly presses all the brake plates from each other, so that when the rotary shaft is rotated in a reverse direction, the second rotary brake plate is not applied to a braking action under a shut-off state of the one-way clutch.

17 Claims, 6 Drawing Sheets

MULTI-PLATE TYPE BRAKE FOR VEHICLE

BACKGROUND OF THE INVENTION

1. Field of the Invention

This invention relates to a multi-plate type brake for a vehicle, and more particularly, an improvement of the multi-plate type brake for a vehicle comprised of a rotary brake plate connected to a rotary shaft coupled to wheels and connected to be rotated together with the rotary shaft, a fixed brake plate overlapped on the rotary brake plate end pressing means for forcedly press contacting these rotary brake plate and fixed brake plate to each other, wherein a braking force is applied to the rotary shaft under a mutual press contacting state between the rotary brake plate and the fixed brake plate under an operation of the pressing means.

2. Description of Background Art

Such a multi-plate type brake for a vehicle as above is already known as shown in a gazette of Japanese Utility Model Laid-Open No. Sho 55-47443, for example.

In the prior art multi-plate type brake, a value of the braking force produced by the brake is not almost changed even under both a forward motion of the vehicle and a backward motion of the vehicle. Accordingly, if the braking force is set to be relatively high and a smooth braking operation can be carried out under its advancing state, the braking force may become a little bit higher value under its backward motion, resulting in that the steering operation may be hardly carried out. In addition, in contrast to this operation, if the braking force produced by the multi-plate type brake is set to be such a value as one which is suitable for a rearward operation steering, the braking force may become of an insufficient value under its forward motion.

In view of the foregoing description, the present invention has been invented and it is an object of the present invention to provide a multi-plate type brake for a vehicle in which a high braking force is produced when the vehicle moves forward and the braking force can be automatically reduced when the vehicle moves rearwardly.

SUMMARY AND OBJECTS OF THE INVENTION

In order to accomplish the aforesaid object, the present invention is characterized in that the multi-plate type brake for a vehicle is comprised of a first rotary brake plate connected to a rotary shaft connected to a wheel so as to be rotated by the shaft, a second rotary brake plate arranged around said rotary shaft in such a way that they may be rotated in a relative manner, one-way clutch installed between the second rotary brake plate and said rotary shaft which becomes a connected state curing a normal rotation of said rotary shaft and becomes a shut-off state during its reverse rotation, a first fixed brake plate overlapped on the first rotary brake plate, the second fixed brake plate overlapped on the second rotary brake plate, a brake ease for unrotatably supporting the first and second fixed brake plates, and pressing means for forcedly pressing all the brake plates from each other.

In the aforesaid configuration, since the one-way clutch is kept at its connected state under a normal rotating state (when the vehicle advances forwardly) of the rotary shaft, the second rotary brake plate is also rotated similarly together with the first rotary brake plate. Accordingly, when all the brake plates are pressed to each other by the pressing means under this state, the rotary shaft can be forcedly braked by the frictional force generated between each of the first rotary brake plate and the first fixed brake plate and between the second rotary brake plate and the second fixed brake plate.

In addition, under the reverse rotated state of the rotary shaft (when the vehicle moves backward), the one-way clutch becomes a shut-off state to cause the second rotary brake plate to be free, so that even if all the brake plates are press contacted to each other by the pressing means under this condition, only the first rotary brake plate and the first fixed brake plate are applied for braking the rotary shaft, resulting in that the braking force applied to the rotary shaft is reduced by such an amount as one in which the second rotary brake plate and the second fixed brake plate are not applied for the braking operation.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

A preferred embodiment of the present invention will be described as follows in reference to one preferred embodiment of the present invention shown in the accompanying drawings.

Figure 1:
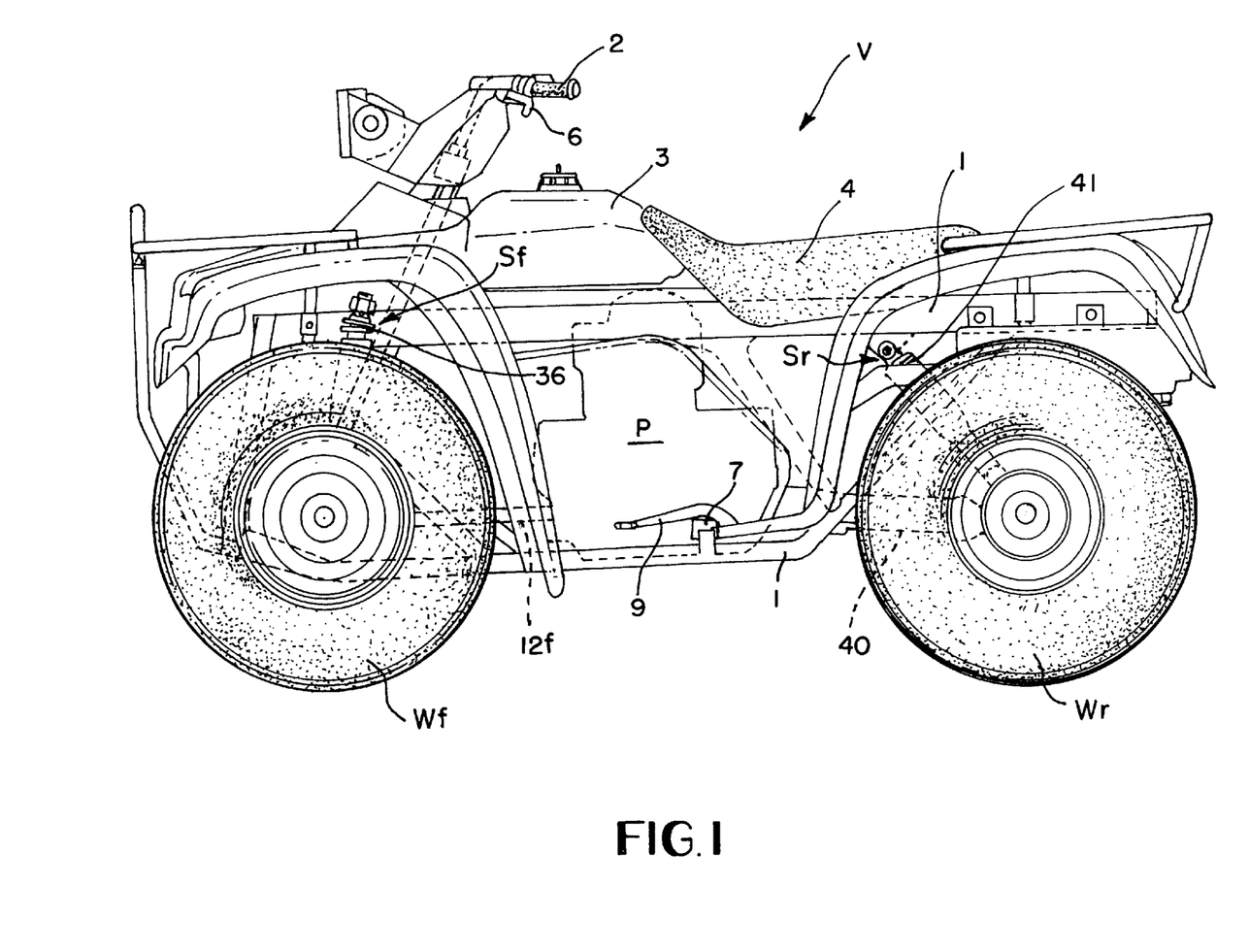
FIG. 1 is a side elevational view of a four-wheel driving type buggy of the preferred embodiment of the present invention.
Figure 2:
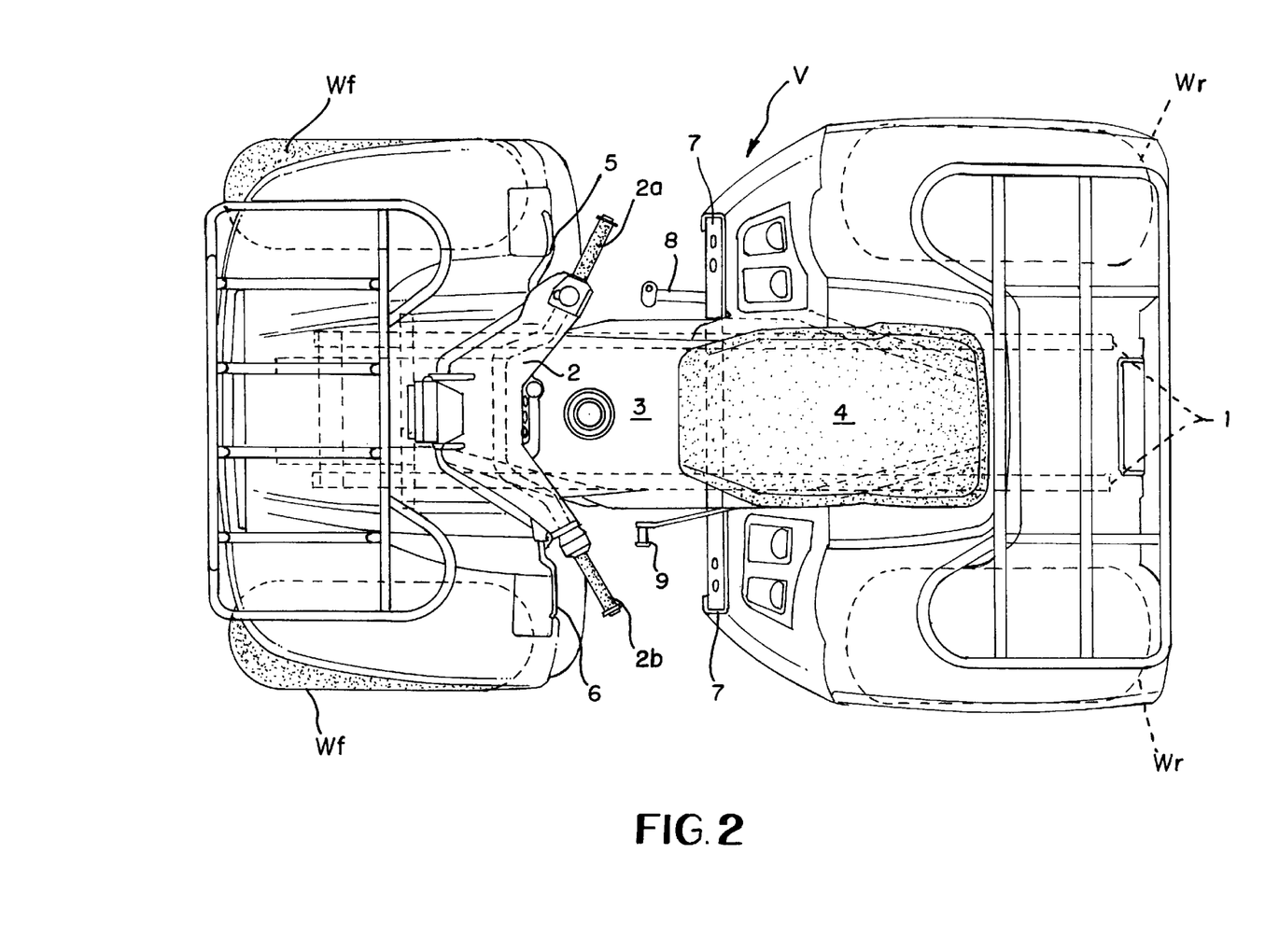
FIG. 2 is a top plan view of the buggy.

In FIGS. 1 and 2, each of a pair of right and left front wheels Wf and rear wheels Wr is supported at each of front section end rear section of a vehicle body frame 1 of a buggy V acting as an auto-vehicle through a front suspension device Sf and a rear suspension device Sr. Balloon type low pressure tires are installed at these wheels. In addition, a steering handle 2, a fuel tank 3 and a striding type seat 4 are arranged in this order from a forward part above the vehicle body frame 1. A power unit P for use in driving the front wheel Wf and the rear wheel Wr is mounted below the fuel tank 3 and at the central part of the vehicle body frame 1 and the power unit P is supported through a resilient mount member. A brake lever 5 is pivotally supported near a right side grip 2a at the steering handle 2 and a clutch lever 6 is pivotally supported near a left side grip 2b of the steering handle 2.

A pair of right and left steps 7 projecting in a left outward direction and a right outward direction of the power unit P are fixed to the lower central section of the vehicle body frame 1 so as to support both feet of a driver sitting on the seat 4. A brake pedal 8 is arranged near the right step 7 and a change pedal 9 is arranged near the left step 7, respectively.

Figure 3:
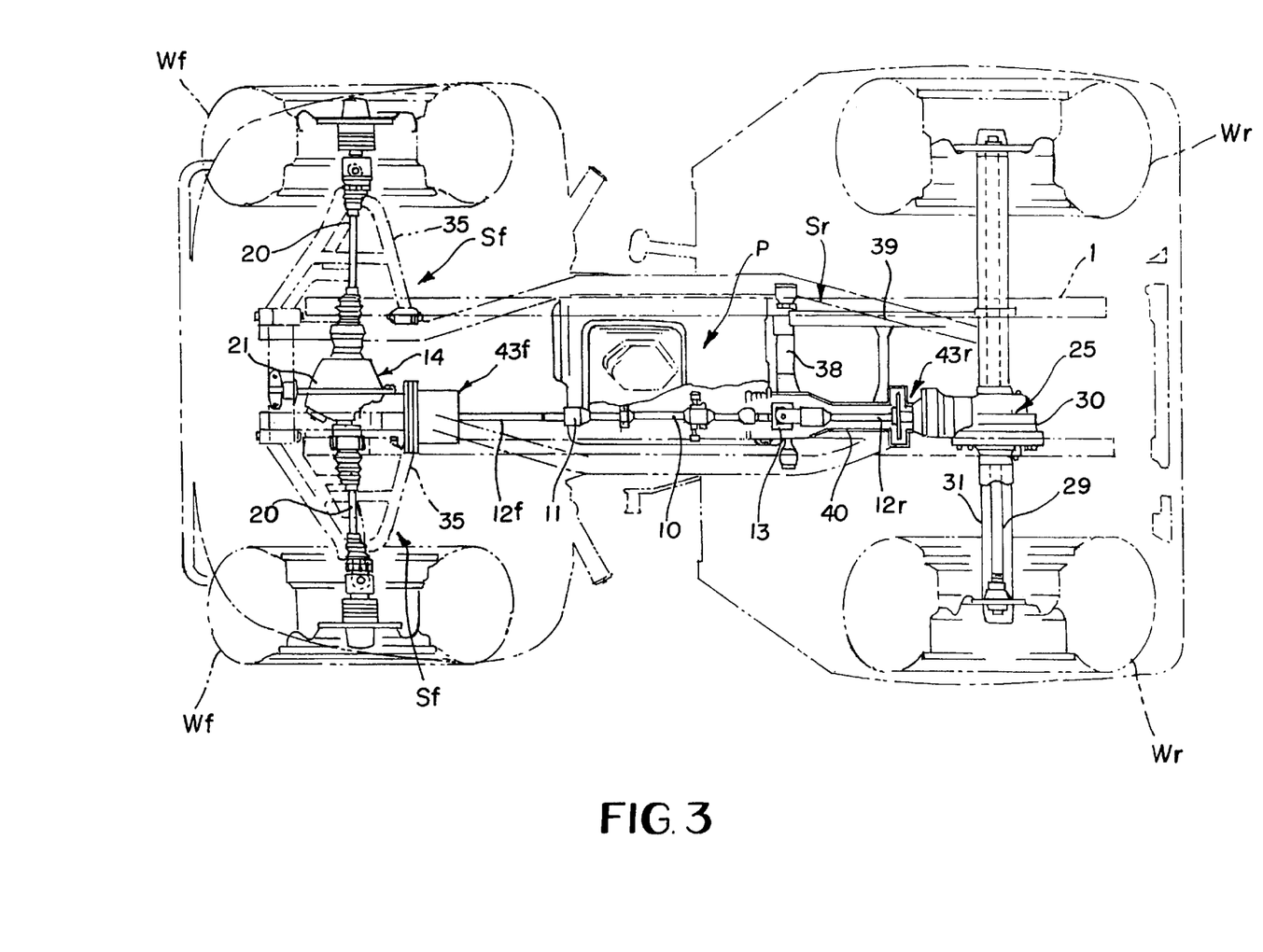
FIG. 3 is a top plan view of a power transmitting system of the buggy.
Figure 4:
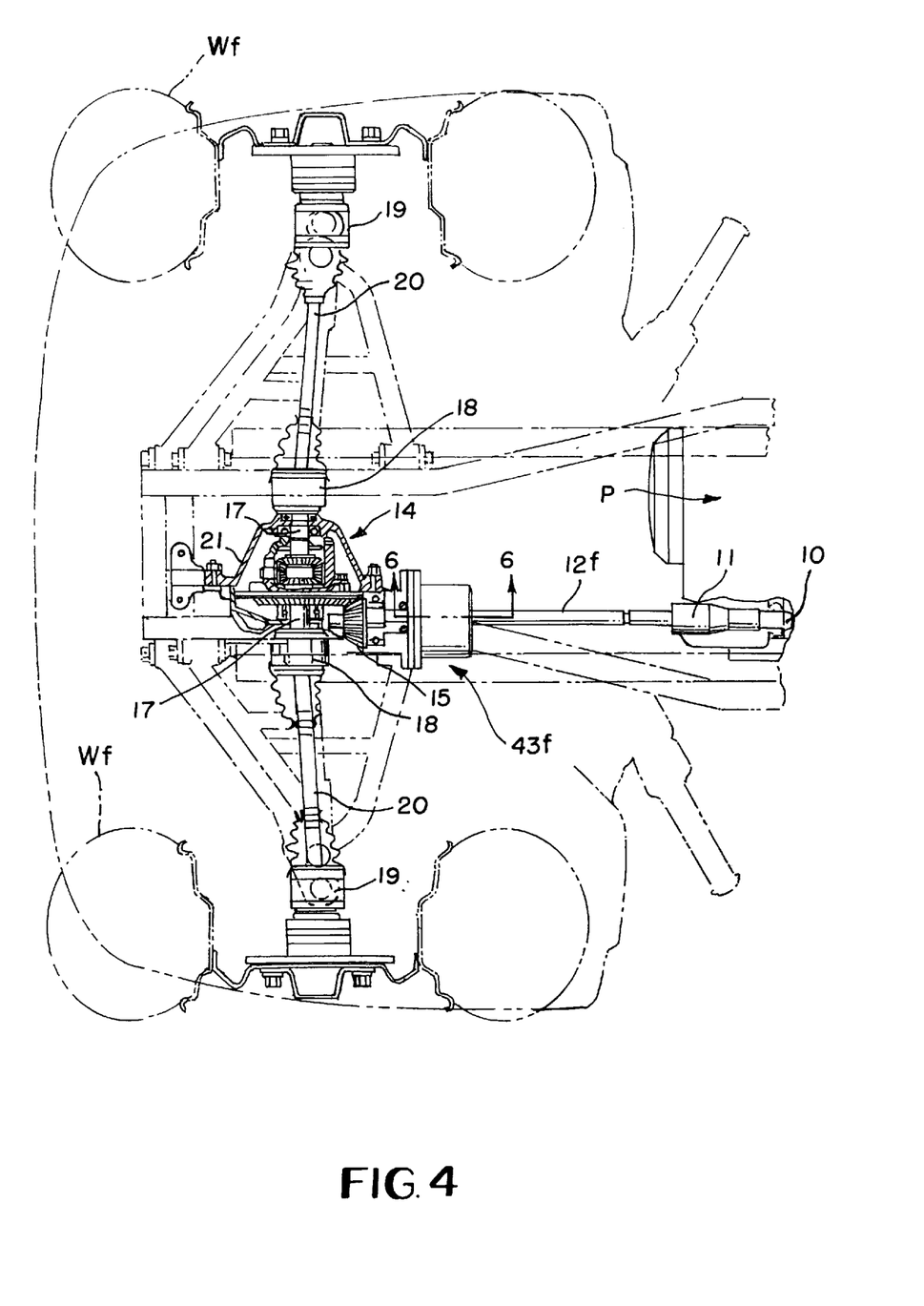
FIG. 4 is a top plan view for showing a front wheel driving section.
Figure 5:
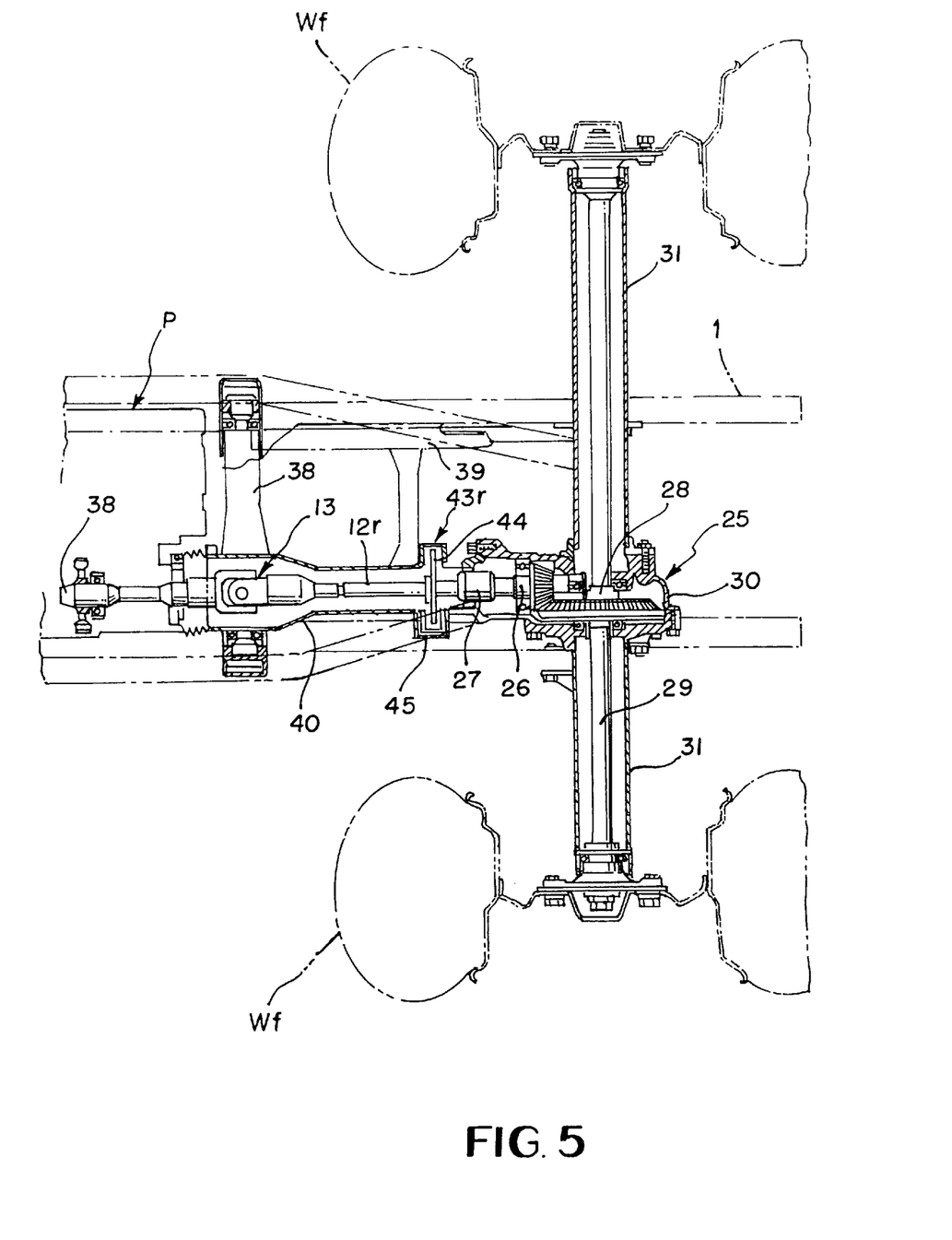
FIG. 5 is a top plan view for showing a rear wheel driving section.

FIGS. 3 to 5 illustrate a power transmitting system ranging from the power unit P to the front wheel Wf and the rear wheel Wr, wherein FIG. 3 is an entire top plan view, FIG. 4 is a top plan view for showing a front wheel driving section and FIG. 5 is a top plan view for showing a rear wheel driving section. In FIGS. 3–5, the power unit P is provided with an output shaft 10 extending in a forward and a rearward direction of the vehicle body, wherein to its front end is connected the rear end of a front part propeller shaft 12f through a coupling 11. In addition, to the rear end of the output shaft 10 is connected the front end of the rear part propeller shaft 12r provided with a hooks joint 13.

The front end of the front part propeller shaft 12f is connected to an input gear 15 of a front wheel differential device 14, and the front wheels Wf are connected to a right output member 17 and a left output member 17 of the differential device 14 through front wheel driving shafts 20 provided with uniform velocity joints 18, 19 at both inner end outer ends. A differential case 21 of the front wheel differential device 14 is fixed to the vehicle body frame 1.

In addition, the rear end of the rear part propeller shaft 12r is connected to an input member 26 of the rear wheel driving gear device 25 through a coupling 27, and both right and left rear wheels Wr are connected to both ends of a single rear wheel shaft 29 integrally connected to the output member 28 of the device 25. An axle case 31 is integrally connected to both right and left ends of the housing 30 of the rear wheel driving gear device 25 and then the rear wheel shaft 29 is supported by the axle case 31.

The aforesaid front part suspension device Sf has asymmetrical structure which is comprised of suspension arms 35 pivotally supported at one of the right and left sides of the vehicle body frame 1 in such a way that they may be pivoted to support the front wheels Wf, end a front damper 36 having a suspension spring installed between the suspension arm 35 and the vehicle body frame 1 (refer to FIG. 1.).

In addition, the aforesaid rear part suspension device Sr is comprised of a pivot shaft 38 rotatably and laterally arranged at the vehicle body frame 1; a right fork leg 39 for integrally connecting the right end of the pivot shaft 38 to the aforesaid axle case 31; a left fork leg 40 for integrally connecting the left end part of the shaft 38 with the aforesaid housing 30; and a rear damper 41 having a suspension spring installed between the axle case 31 and the vehicle body frame 1 (refer to FIG. 1). The left fork leg 40 is constructed by a hollow pipe and the aforesaid rear part propeller shaft 12r is arranged to pass through the hollow part. At that time, the hooks joint 13 is arranged such that its center of oscillation comes onto an axis line of the pivot shaft 38, thereby even during upward or downward oscillation of the right and left fork legs 39, 40, a power transmitting operation for transmitting a power from the output shaft 10 to the rear part propeller shaft 12r can be carried out without any trouble.

Between shaft 12f (a rotary shaft) is arranged a multi-plate type front part the differential case 21 fixed to the vehicle body frame 1 and the front part propeller brake 43f of the present invention for use in braking a rotation of the shaft 12f.

Figure 6:
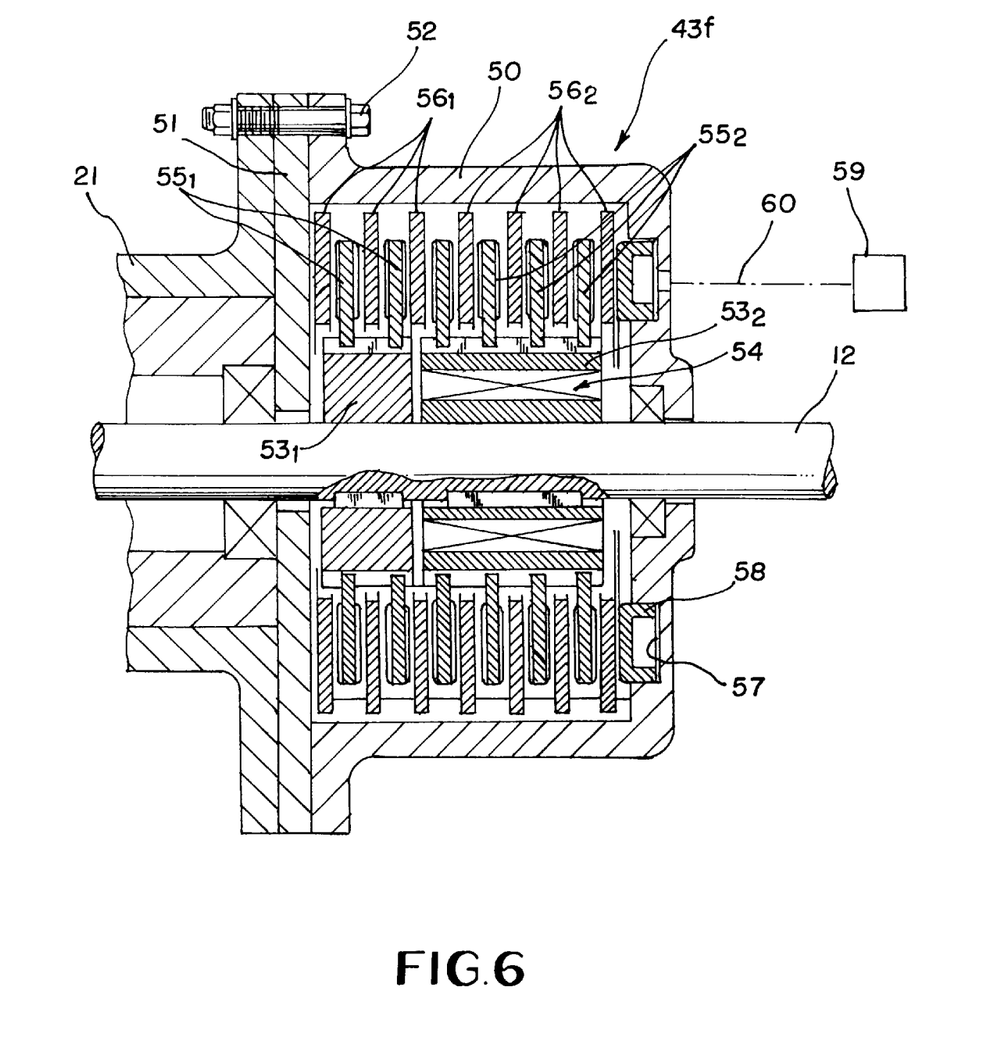
FIG. 6 is a longitudinal section for showing a front brake (a sectional view taken along a line 6—6 of FIG. 4.

As shown in FIG. 6, this multi-plate front part brake 43f is provided with a brake case 50 fixed by a bolt 52 with a pressure receiving plate 51 being held at the differential case 21, wherein within this differential case 50 are stored a first brake inner $53_1$ connected by a key with the front part propeller shaft 12f; a second brake inner $53_2$ adjacent to the first brake inner $53_1$ so as to enclose the front part propeller shaft 12f in such a way that it can be rotated relatively; one-way clutch 54 installed between the second brake inner $53_2$ and the front part propeller shaft 12f; a plurality of first rotary brake plates $55_1$ slidably spline engaged with the outer circumference of the first brake inner $53_1$; a plurality of second rotary brake plates $55_2$ slidably spline engaged with the outer circumference of the second brake inner $53_2$; a plurality of first fixed brake plates $56_1$ slidably spline engaged with the inner circumference of the brake case 50 while they are being overlapped alternatively on the first rotary brake plates $55_1$; and a plurality of second fixed brake plates $56_2$ slidably spline engaged with the inner circumference of the brake case 50 while they are being alternatively overlapped on the second brake plate $55_2$. At that time, the number of the second rotary brake plate $55_2$ and the second fixed brake plates $56_2$ is set to be more than the number of the first rotary brake plates $55_1$ and the first fixed brake plates $56_1$. One-way clutch 54 becomes a connected state only when the front part propeller shaft 12f is normally rotated so as to transmit its rotation to the second brake inner $53_2$.

Additionally, into an annular hydraulic cylinder 57 formed at the end wall of the brake case 50 is an annular pressurizing piston 58 opposing against the pressure receiving plate 51 with the aforesaid group of brake plates $55_1$, $56_1$, $55_2$, $56_2$ being held thereat. This pressurizing piston 58 cooperates with the pressure receiving plate 51 to constitute a pressing means for use in mutually press contacting the groups of brake plates $55_1$, $56_1$, $55_2$, $56_2$.

Within the hydraulic cylinder 57, it is communicated with an output port of the master cylinder 59 operated by the aforesaid brake lever 5 through a hydraulic conduit 60.

The inner mechanism of the brake case 50 may be of a dry type or a wet type.

In FIGS. 3 to 5 again, between the hollow left fork leg 40 supported at the vehicle body frame 1 through the pivot shaft 38 and the rear part propeller shaft 12r is arranged a rear part brake 43r for use in braking a rotation of the shaft 12r. This rear part brake 43r is a well-known disk brake which is comprised of a brake disk 44 fixed to the rear part propeller shaft 12r and a brake caliper 45 fixed to the left fork leg 40 arranged to hold both side surfaces at its outer circumferential side, wherein the brake caliper 45 is provided with a frictional pad forcedly contacted with both side surfaces of the brake disk 44 under an operation of the aforesaid brake pedal 8. This rear part brake 43r is operated under an operation of the brake pedals, wherein a braking force produced by this brake pedal is set to be smaller than the maximum braking force produced by the front part brake 43f.

Then, an operation of this preferred embodiment will be described.

If the power unit P is operated, its power is concurrently outputted from the output shaft 10 to the front part propeller shaft 12f and the rear part propeller shaft 12r through each of the coupling 11 and the joint 13, a power outputted to the front part propeller shaft 12f is transmitted to the right and left driving shafts 20 through the front wheel differential device 14 so as to drive a pair of front wheels Wf. In addition, power outputted to the rear part propeller shaft 12r is transmitted to the rear wheel shaft 29 through the rear wheel driving gear device 25 so as to drive a pair of rear wheels Wr. In this way, the front and rear wheels Wf, Wr are driven concurrently, so that the buggy 1 can easily run on a non-leveled ground.

During a forward running of this buggy 1, the master cylinder 59 is operated by the brake lever 5, its output hydraulic pressure is supplied to the hydraulic cylinder 57 of the front part brake 43f, resulting in that the pressurizing piston 58 is operated to press all the brake plates $55_1$, $56_1$; $55_2$, $56_2$ against the pressure receiving plate 51 so as to press contact each of the first rotary brake plate $55_1$ and the first fixed brake plate $56_1$, the second rotary brake plate $55_2$ and the second fixed brake plate $56_2$ and then the first and second brake inners $53_1$ and $53_2$ are braked by the frictional force generated between them.

In this way, when the buggy 1 advances forward, the one-way clutch 54 is kept at its connected state under a normal rotation of the front part propeller shaft 12f, so that the second brake inner $53_2$ is also being rotated together with the front part propeller shaft 12f in the same manner as that of the first brake inner $53_1$, and accordingly as described above, all the braking forces applied to the first and second brake inners $53_1$, $53_2$ may act against the front part propeller shaft 12f. This front part propeller shaft 12f is also connected to the rear part propeller shaft 12r through the output shaft 10 of the power unit P so that a high braking force acted on the front part propeller shaft 12f is lastly applied to the front wheels Wf and the rear wheels Wr in a concurrent manner and then these wheels can be forcedly braked.

However, although applying such a high braking force as above during a backward motion of the buggy to the front and rear wheels Wf, Wr causes its steering operation to be hardly carried out, a braking force generated by the front part brake 43f is automatically reduced as described below. That is, during the backward motion of the buggy, the one-way clutch 54 becomes a cut-off state by a reverse rotation of the front part propeller shaft 12f so as to cause the second brake inner $53_2$ and the second rotary brake plate $55_2$ to be free, so that, under this state, even if the pressurizing piston 58 is operated with the output hydraulic pressure of the master cylinder 59 to press the group of the brake plates $55_1$, $56_1$, $55_2$, $56_2$ against the pressure receiving plate 51, the second rotary brake plate $55_2$ and the second fixed brake plate $56_2$ are applied to the braking for the rear part propeller shaft 12r and the braking force is applied to the front part propeller shaft 12f only with the first rotary brake plate $55_1$ and the first fixed brake plate $56_1$. In this way, the braking force applied to the front part propeller shaft 12f is automatically reduced by such an amount as one in which the second rotary brake plate $52_2$ and the second fixed brake plate $56_2$ are applied for a braking action, resulting in that the backward motion steering operation can be easily performed. A rate of reduction of the braking force is determined in reference to a rate of the number of second rotary brake plate $55_2$ and the second fixed brake plate $56_2$ occupied in all the brake plates $55_1$, $56_1$; $55_2$, $56_2$. Accordingly, it is possible to freely set a value of the braking force during a backward motion of the buggy by making a proper selection of the reducing rate.

In turn, if the brake pedal 8 is operated, as described above, the rear part brake 43r is operated to apply the braking force to the rear part propeller shaft 12r so as to enable the front wheels and rear wheels Wf, Wr to be braked in a concurrent manner, although the braking force is already set to be smaller than the braking force of the front part brake 43f, so that it is not necessary to reduce the braking force when the buggy moves in a backward direction.

In view of the foregoing, each of these front part brake 43f and rear part brake 43r is arranged one by one between the vehicle body frame 1 and each of the front part, rear part propeller shafts 12f, 12r, so that it is possible to simplify the structure of the brake device. In addition, the front part brake 43f is arranged in spaced-apart relation from the front part suspension device Sf, resulting in that a spring load of the suspension device Sf is not increased. In addition, although the rear part brake 43r is arranged in the rear part suspension device Sr, it is arranged between the left fork leg 40 which is relatively near the pivot shaft 38 and the rear part propeller shaft 12r, resulting in that as compared with that of the prior art in which it is arranged on the rear wheel shaft 29, it is possible to reduce an inertia momentum of the spring of the rear part suspension device Sr.

In addition, since the front part brake 43f is arranged at the front part propeller shaft 12f connected through the coupling 11, and the rear part brake 43r is arranged at the rear part propeller shaft 12r connected to the output shaft 10 through the joint 13, respectively, even if either the coupling 11 or the joint 13 is damaged due to a certain reason, the front part brake 43f and the rear part brake 43r are operated to enable each of the front wheels Wf and the rear wheels Wr to be braked individually without any trouble.

The present invention is not limited to the aforesaid preferred embodiment, and various modifications in design can be carried out within a scope not exceeding its gist. For example, it is also possible to constitute the rear part brake 43r in the multi-plate type of the present invention. In addition, it is also possible to apply the present invention to these brakes in which the buggy 1 is of a front wheel driving vehicle or a rear wheel driving vehicle and further the present invention is not limited to the buggy, but the present invention can also be applied to other types of brakes for four-wheel vehicle.

As described above, in accordance with the present invention, the first rotary brake plates connected to the rotary shaft connected to the wheels and coupled to be rotated together with it, the second rotary brake plates arranged around the aforesaid rotary shaft in such a way that they may tee rotated to each other, one-way clutch installed between each of the second rotary brake plates and the aforesaid rotary shaft to become a connected state during a normal rotation of the aforesaid rotary shaft and a shut-off state during its reverse rotation, the first fixed brake plates overlapped on the first rotary brake plates, the second fixed brake plates overlapped on the second rotary brake plates, the brake case for non-rotatably supporting the first and second fixed brake plates and all the brake plates are of a multi-plate type brake, so that when the rotary shaft is rotated, a large braking force can be applied to the rotary shaft under a connecting action of the one-way clutch and in addition when the braking is applied under a reverse rotation of the rotary shaft (when the vehicle is moved backward), the one-way clutch is applied to cause the second rotary brake plates and the second fixed brake plates not to be applied to braking action, resulting in that the braking force applied to the rotary shaft can be automatically reduced.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A multi-plate type brake for a vehicle comprising:
   a plurality of first rotary brake plates operatively connected to a rotary shaft connected to at least one wheel, said plurality of first rotary brake plates being slidably spline engaged with an outer circumference of a first brake inner;

a second rotary brake plate arranged around said rotary shaft for rotation relative to each other;

a one-way clutch installed between the second rotary brake plate and said rotary shaft, said one-way clutch being in a connected state during a normal rotation of said rotary shaft and being in a shut-off state during a reverse rotation of said rotary shaft;

a first fixed brake plate being overlapped on at least one of said plurality of first rotary brake plates;

a second fixed brake plate being overlapped on the second rotary brake plate; and a brake case for unrotatably supporting the first and second fixed brake plates and pressing means for selectively, forcedly pressing all the brake plates relative to each other.

2. The multi-plate type brake for a vehicle according to claim 1, and further including a plurality of second rotary brake plates being slidably spline engaged with an outer circumference of a second brake inner.

3. A The multi-plate type brake for a vehicle according to claim 1, and further including a plurality of first fixed brake plates being slidably spline engaged with an inner circumference of the brake case.

4. The multi-plate type brake for a vehicle according to claim 1, and further including a plurality of second fixed brake plates being slidably spline engaged with an inner circumference of the brake case.

5. The multi-plate type brake for a vehicle according to claim 4, and further including a plurality of first fixed brake plates being alternatively overlapped with the plurality of second fixed brake plates.

6. The multi-plate type brake for a vehicle according to claim 1, wherein the pressing means is an annular pressurizing piston operatively positioned relative to the brake case for selectively applying a pressure to the first rotary brake plate, the second rotary brake plate, the first fixed brake plate and the second fixed brake plate.

7. A multi-plate type brake for a vehicle comprising:

a rotary shaft;

a plurality of first rotary brake plates operatively connected to said rotary shaft, said plurality of first rotary brake plates being slidably spline engaged with an outer circumference of a first brake inner;

a second rotary brake plate operatively mounted relative to said rotary shaft for rotation relative to each other;

a one-way clutch installed between the second rotary brake plate and said rotary shaft, said one-way clutch being in a connected state during a normal rotation of said rotary shaft and being in a shut-off state during a reverse rotation of said rotary shaft;

a first fixed brake plate being overlapped on at least one of said plurality of first rotary brake plates;

a second fixed brake plate being overlapped on the second rotary brake plate; and a fixed brake case for supporting the first and second fixed brake plates and pressing means for selectively, forcedly pressing all the brake plates relative to each other.

8. The multi-plate type brake for a vehicle according to claim 7, and further including a plurality of second rotary brake plates being slidably spline engaged with an outer circumference of a second brake inner.

9. The multi-plate type brake for a vehicle according to claim 7, and further including a plurality of first fixed brake plates being slidably spline engaged with an inner circumference of the brake case.

10. The multi-plate type brake for a vehicle according to claim 7, and further including a plurality of second fixed brake plates being slidably spline engaged with an inner circumference of the brake case.

11. The multi-plate type brake for a vehicle according to claim 10, and further including a plurality of first fixed brake plates being alternatively overlapped with the plurality of second fixed brake plates.

12. The multi-plate type brake for a vehicle according to claim 7, wherein said pressing means is an annular pressurizing piston operatively positioned relative to the brake case for selectively applying a pressure to the first rotary brake plate, the second rotary brake plate, the first fixed brake plate and the second fixed brake plate.

13. A multi-plate type brake for a vehicle comprising:

a rotary shaft;

a plurality of first rotary brake plates operatively connected to said rotary shaft, said plurality of first rotary brake plates being slidably spline engaged with an outer circumference of a first brake inner;

a plurality of second rotary brake plates operatively mounted relative to said rotary shaft for rotation relative to each other, said plurality of second rotary brake plates being slidably spline engaged with an outer circumference of a second brake inner;

a one-way clutch installed between the plurality of second rotary brake plates and said rotary shaft, said one-way clutch being in a connected state during a normal rotation of said rotary shaft and being in a shut-off state during a reverse rotation of said rotary shaft;

a first fixed brake plate being overlapped on at least one of said plurality of first rotary brake plates;

a second fixed brake plate being overlapped on at least one of said plurality of second rotary brake plates;

a fixed brake case for supporting the plurality of first and the plurality of second fixed brake plates; and pressing means being operatively mounted relative to said brake plates for selectively pressing the brake plates relative to each other.

14. The multi-plate type brake for a vehicle according to claim 13, and further including a plurality of first fixed brake plates being slidably spline engaged with an inner circumference of the brake case.

15. The multi-plate type brake for a vehicle according to claim 13, and further including a plurality of second fixed brake plates being slidably spline engaged with an inner circumference of the brake case.

16. The multi-plate type brake for a vehicle according to claim 15, and further including a plurality of first fixed brake plates being alternatively overlapped relatively to the plurality of second fixed brake plates.

17. The multi-plate type brake for a vehicle according to claim 13, wherein said pressing means is an annular pressurizing piston operatively positioned relative to the brake case for selectively applying a pressure to the first rotary brake plate, the second rotary brake plate, the first fixed brake plate and the second fixed brake plate.

* * * * *